(12) United States Patent
Eliasson

(10) Patent No.: US 7,646,971 B2
(45) Date of Patent: Jan. 12, 2010

(54) ASSIST LIGHT ILLUMINANCE CONTROL

(75) Inventor: Henrik Eliasson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 429 days.

(21) Appl. No.: 11/557,247

(22) Filed: Nov. 7, 2006

(65) Prior Publication Data

US 2008/0124067 A1    May 29, 2008

(51) Int. Cl.
  *G03B 15/02*    (2006.01)
(52) U.S. Cl. .................................................. 396/108
(58) Field of Classification Search .................. 396/68, 396/98, 100, 106, 108, 157, 166; 348/234, 348/238, 370; 362/1–18
  See application file for complete search history.

(56) References Cited

U.S. PATENT DOCUMENTS

| | | | | |
|---|---|---|---|---|
| 4,931,866 A | * | 6/1990 | Charlesworth et al. | 348/370 |
| 5,860,029 A | * | 1/1999 | Ichikawa et al. | 396/61 |
| 5,987,261 A | | 11/1999 | Sugahara et al. | |
| 6,704,506 B2 | * | 3/2004 | Sasagawa | 396/88 |
| 2001/0050719 A1 | | 12/2001 | Kobayashi et al. | |
| 2005/0100334 A1 | | 5/2005 | Seo et al. | |
| 2005/0179810 A1 | | 8/2005 | Okamura | |

OTHER PUBLICATIONS

Written Opinion and International Search Report for corresponding PCT application with a mailing date of Oct. 16, 2007; 10 pages.

* cited by examiner

*Primary Examiner*—Kenneth J Whittington
(74) *Attorney, Agent, or Firm*—Harrity & Harrity, LLP

(57) ABSTRACT

A system receives an input with a light sensor of a device, determines a luminance of a subject based on the received input, and adjusts an output of an assist light of the device based on the determined luminance.

16 Claims, 6 Drawing Sheets

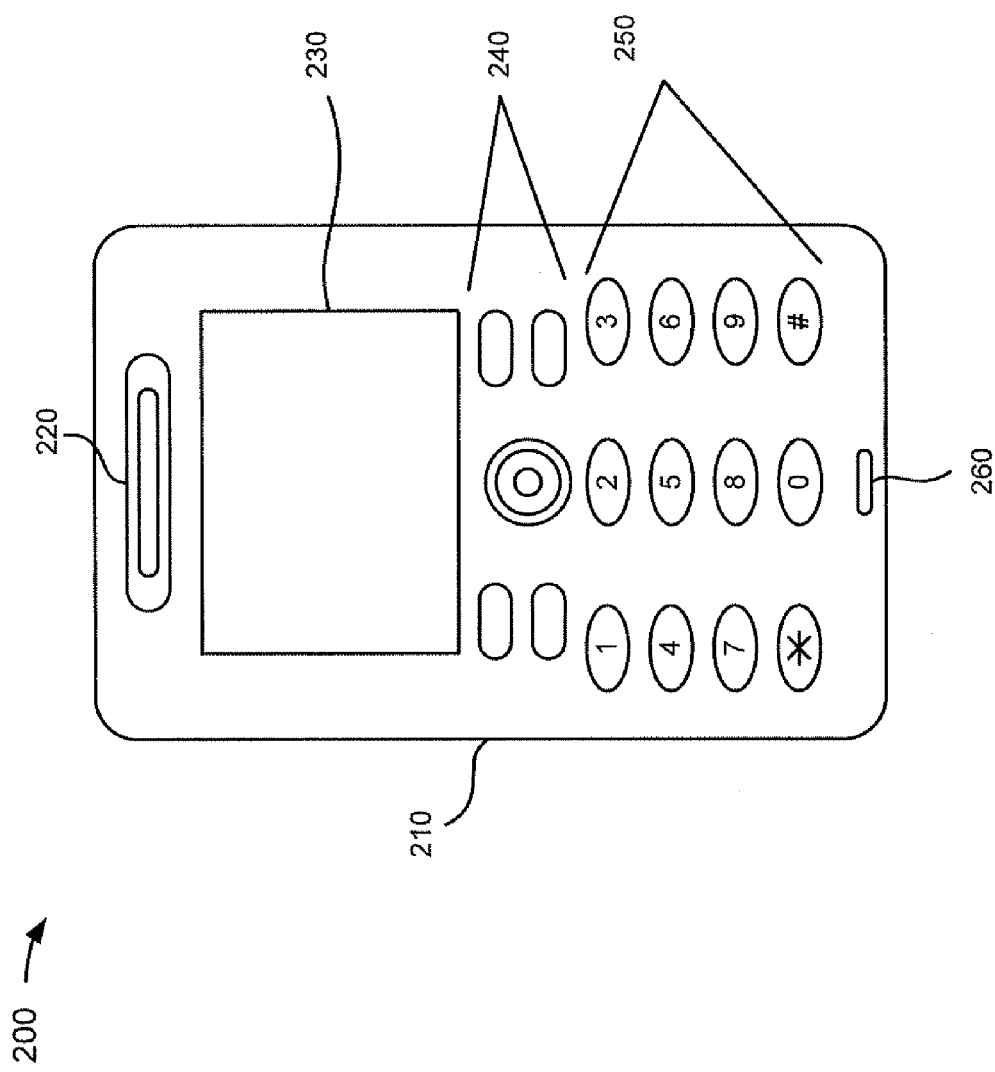

ASSIST LIGHT ILLUMINANCE CONTROL

BACKGROUND

1. Field of the Invention

Implementations described herein relate generally to devices and, more particularly, to a device that controls the illuminance of an assist light.

2. Description of Related Art

An assist light may be used in certain devices (e.g., cameras) to provide a constant light source and improve autofocus performance or exposure in low light conditions. A higher illuminance assist light typically improves the performance of the autofocus and exposure. However, at shorter distances a very bright assist light may lead to saturation of the autofocus sensor (i.e., a sensor used to control an electromechanical system of the device that adjusts the focus of the optical system), which may cause the autofocusing operation to fail. Since the speed of autoexposure is directly related to the frame rate of a camera, which in turn is related to the light level, a high illuminance assist light may be even more problematic in low light situations. A high illuminance assist light may also blind a subject (e.g., person) exposed to the assist light depending on the distance between the device and the subject.

SUMMARY

According to one aspect, a method may include receiving an input with a flash sensor of a device, determining a luminance of a subject based on the received input, and adjusting an output of an assist light of the device based on the determined luminance.

Additionally, the input may include light reflected from the subject.

Additionally, the luminance may be determined by adding an amount of light reflected from the subject.

Additionally, the assist light may include an autofocus assist light.

Additionally, the assist light may include an exposure assist light.

Additionally, the output of assist light may be adjusted so that the assist light may provide a constant luminance for substantially any distance between the subject and the device.

Additionally, the output of the assist light may increase as the luminance decreases, and the output of the assist light may decrease as the luminance increases.

According to another aspect, a device may include means for receiving an input, means for determining a luminance of a subject based on the received input, and means for adjusting an assist light output based on the determined luminance.

According to yet another aspect, a device may include a flash sensor for receiving an input, an assist light that outputs light to a subject, and processing logic to determine luminance of the subject based on the received input, and adjust the output of the assist light based on the luminance.

Additionally, the device may include at least one of a radiotelephone, a personal communications system (PCS) terminal, a laptop, a personal computer, an MP3 player, a camera, a video camera with camera capabilities, binoculars, or a telescope.

Additionally, the flash sensor may include a light sensor that may receive light reflected back from the subject.

Additionally, the input may include light reflected from the subject.

Additionally, the luminance may be determined by adding an amount of light reflected from the subject.

Additionally, the assist light may include an autofocus assist light.

Additionally, the assist light may include an exposure assist light.

Additionally, the output of assist light may be adjusted so that the assist light may provide a constant luminance of the subject for substantially any distance between the subject and the device.

Additionally, the output of the assist light may increase as the luminance decreases, and the output of the assist light may decrease as the luminance increases.

Additionally, the assist light may include at least one of one or more light-emitting diodes (LEDs), or one or more white incandescent lights.

According to a further aspect, a device may include a sensor for receiving an input, an assist light that outputs light to a subject, a memory to store instructions, and a processor to execute the instructions to determine a luminance of the subject based on the received input, and adjust the output of the assist light based on the luminance.

BRIEF DESCRIPTION OF THE DRAWINGS

The accompanying drawings, which are incorporated in and constitute a part of this specification, illustrate an embodiment of the invention and, together with the description, explain the invention. In the drawings:

FIGS. 2A and 2B are front and rear views, respectively, of another exemplary device in which systems and methods described herein may be implemented;

DETAILED DESCRIPTION

Figure 1:
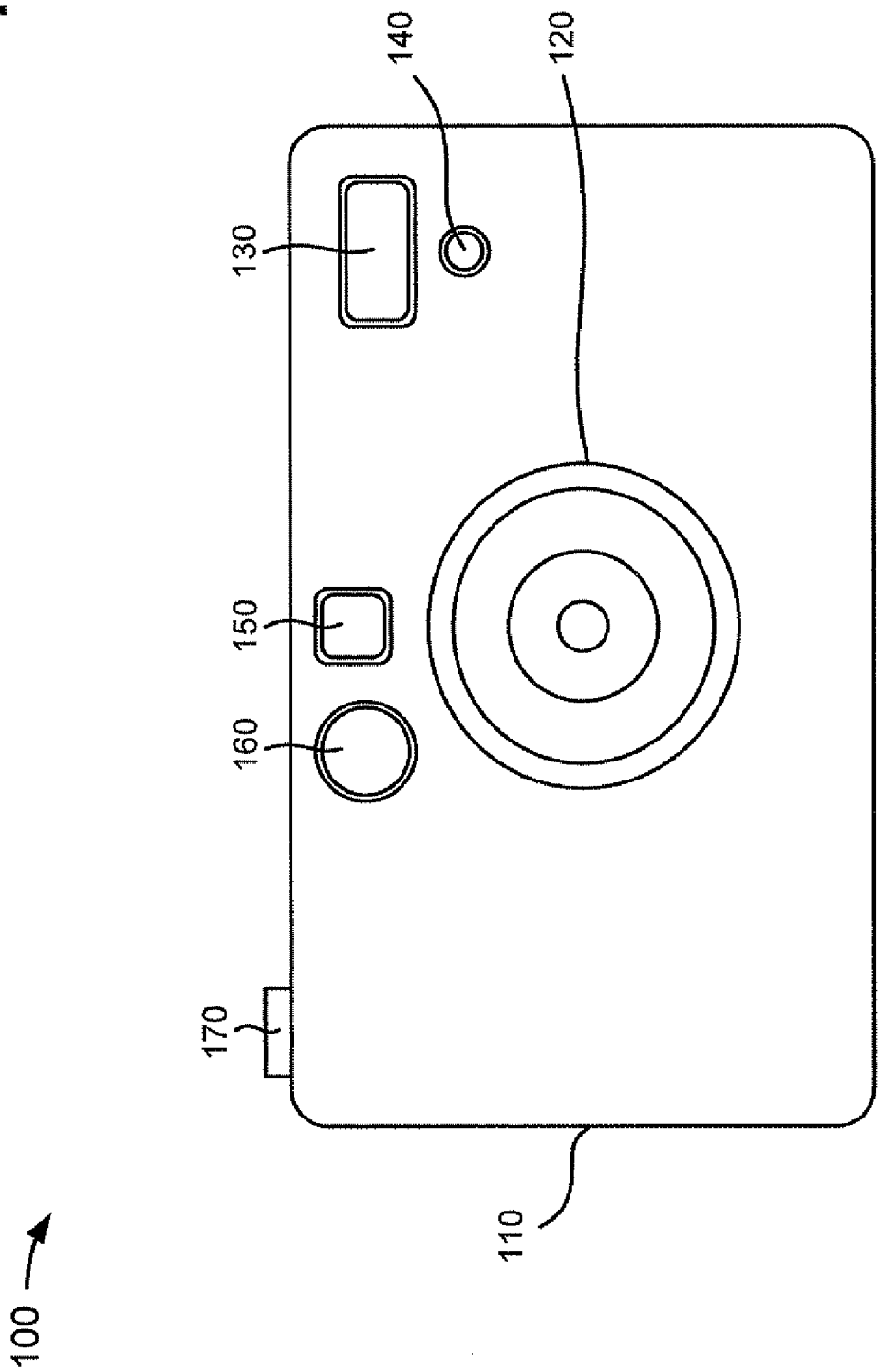
FIG. 1 is a diagram of an exemplary device in which systems and methods described herein may be implemented.

The following detailed description of the invention refers to the accompanying drawings. The same reference numbers in different drawings may identify the same or similar elements. Also, the following detailed description does not limit the invention.

Implementations described herein may relate to systems and methods for controlling the illuminance of an assist light of a device. In one implementation, the device may include a flash sensor that may determine a luminance (i.e., radiance or reflected light level) of a subject. The flash sensor may control the light output or illuminance (or irradiance) of a flash unit of the device based on the determined luminance of the subject. The flash sensor may also be used to control the output or illuminance (or irradiance) of the assist light of the device based on the determined luminance of the subject. For example, the luminance determined by the flash sensor may be used to control the output of the assist light so that the luminance of the subject may be constant, regardless of the distance between the device and the subject. Control of the assist light illuminance may occur almost instantaneously since the response times of the flash sensor and assist light may be almost instantaneous. Such an arrangement may prevent saturation of an autofocus sensor of the device as well as prevent blinding of the subject.

The description to follow will describe a device. As used herein, a "device" may include a radiotelephone; a personal communications system (PCS) terminal that may combine a cellular radiotelephone with data processing, facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; an MP3 player; a camera (e.g., contemporary camera or digital camera); a video camera (e.g., a camcorder with camera capabilities); a calculator; binoculars; a telescope; and/or any other device capable of utilizing a camera.

As used herein, a "camera" may include a device that may capture and store images and/or video. For example, a digital camera may be an electronic device that may capture and store images and/or video electronically instead of using photographic film as in contemporary cameras. A digital camera may be multifunctional, with some devices capable of recording sound and/or video, as well as images.

A "subject," as the term is used herein, is to be broadly interpreted to include any person, place, and/or thing capable of being irradiated by an assist light. For example, a person may include celebrities, musicians, singers, movie stars, athletes, friends, and/or any person capable of being irradiated by an assist light; a place may include buildings, landmarks, roads, bridges, and/or any place capable of being irradiated by an assist light; and/or a thing may include animals, plants, trees, and/or any "thing" capable of being irradiated by an assist light.

Exemplary Device Architectures

FIG. 1 is a diagram of an exemplary device 100 in which systems and methods described herein may be implemented. As shown in FIG. 1, device 100 may include a housing 110, a lens 120, a flash unit 130, a flash sensor 140, a viewfinder 150, an assist light 160, and a button 170. Housing 110 may protect the components of device 100 from outside elements.

Lens 120 may include a mechanically, electrically, and/or electromechanically controlled assembly of lens(es) whose focal length may be changed, as opposed to a prime lens, which may have a fixed focal length. Lens 120 may include "zoom lenses" that may be described by the ratio of their longest and shortest focal lengths. For example, a zoom lens with focal lengths ranging from 100 millimeters (mm) to 400 mm may be described as a "4×" zoom. Zoom lenses may range, for example, from more than about "1×" to about "12×". Some digital cameras may allow cropping and enlarging of the resultant image once the limits of a zoom lens have been reached, in order to emulate the effect of a longer length focal length zoom lens. There may be a variety of designs for zoom lenses. For example, many zoom lenses may include multiple individual lenses that may be either fixed and/or may slide axially along the body of the lens. If the magnification of the zoom lens changes, movement of the focal plane may be compensated for to keep the focused image sharp. This compensation may be done by mechanical means (e.g., moving the lens assembly as the magnification of the lens changes) and/or optically (e.g., arranging the position of the focal plane to vary as little as possible as the lens is zoomed).

Lens 120 may work in conjunction with an autofocus system (not shown) that may enable lens 120 to obtain the correct focus on a subject, instead of requiring a user of device 100 to manually adjust the focus. The autofocus system may rely on one or more autofocus sensors (not shown) to determine the correct focus. The autofocus system may permit manual selection of the sensor(s), and may offer automatic selection of the autofocus sensor(s) using algorithms which attempt to discern the location of the subject. The data collected from the autofocus sensors may be used to control an electromechanical system that may adjust the focus of the optical system.

Flash unit 130 may include any type of flash unit used in cameras. For example, flash unit 130 may include a flash unit built into device 100; a flash unit separate from device 100; an electronic xenon flash lamp (e.g., a tube filled with xenon gas, where electricity of high voltage is discharged to generate an electrical arc that emits a short flash of light); a microflash (e.g., a special, high-voltage flash unit designed to discharge a flash of light with a sub-microsecond duration); etc.

Flash sensor 140 may include a variety of mechanisms for determining the luminance of a subject and for metering flash unit 130 based on the determined luminance. For example, flash sensor 140 may include a sensor provided on the front of flash unit 130 which determines the luminance of the subject (e.g., the amount of flash light reflected back from the subject) and cuts off flash unit 130 once it determines that the subject has been properly illuminated; a through the lens (TTL) flash sensor (e.g., a sensor installed in body 110 of device 100 that may see through lens 120 and may make flash adjustments as required of the subject); a multi-sensor TTL flash metering system (e.g., the image of the subject may be divided into different portions and device 100 may calculate weighting factors dependent on the metered light distribution, i.e., the brightest image portion may receive the highest weighting factor assuming that a subject closest to the camera reflects the most light when illuminated by the flash); an autofocus-coupled multi-sensor TTL flash metering system (e.g., instead of relying purely on the metering pattern, a selected autofocus sensor(s) may also be taken into account); a balanced TTL flash metering system (e.g., a pre-flash may be generated by flash unit 130, and the flash metering system may interpret the luminance of the subject and may balance this data with the information received from the TTL flash metering sensors during the exposure); etc.

Viewfinder 150 may include a window that a user of device 100 may look through to view and/or focus on a subject. For example, viewfinder 150 may include an optical viewfinder (e.g., a reversed telescope); an electronic viewfinder (e.g., a cathode ray tube (CRT), liquid crystal display (LCD), or an organic light-emitting diode (OLED) based display that may be used as a viewfinder and/or to replay previously captured material); or a combination of the aforementioned.

Assist light 160 may be a supplementary lighting system used to aid the autofocus system provided in lens 120 achieve focus and to ensure proper exposure in low light conditions. Assist light 160 may include, for example, an autofocus assist light, a video-snapshot exposure assist light, one or more light-emitting diodes (LEDs), one or more white incandescent lights, or another light source that aids in low light conditions.

Button 170 may include a conventional mechanical or electromechanical button that may be used to capture an image of the subject by device 100. If the user of device 100 engages button 170, device 100 may engage lens 120 (and the autofocus system), flash unit 130, flash sensor 140, and assist light 160 in order to capture an image of the subject with device 100.

Figure 2B:
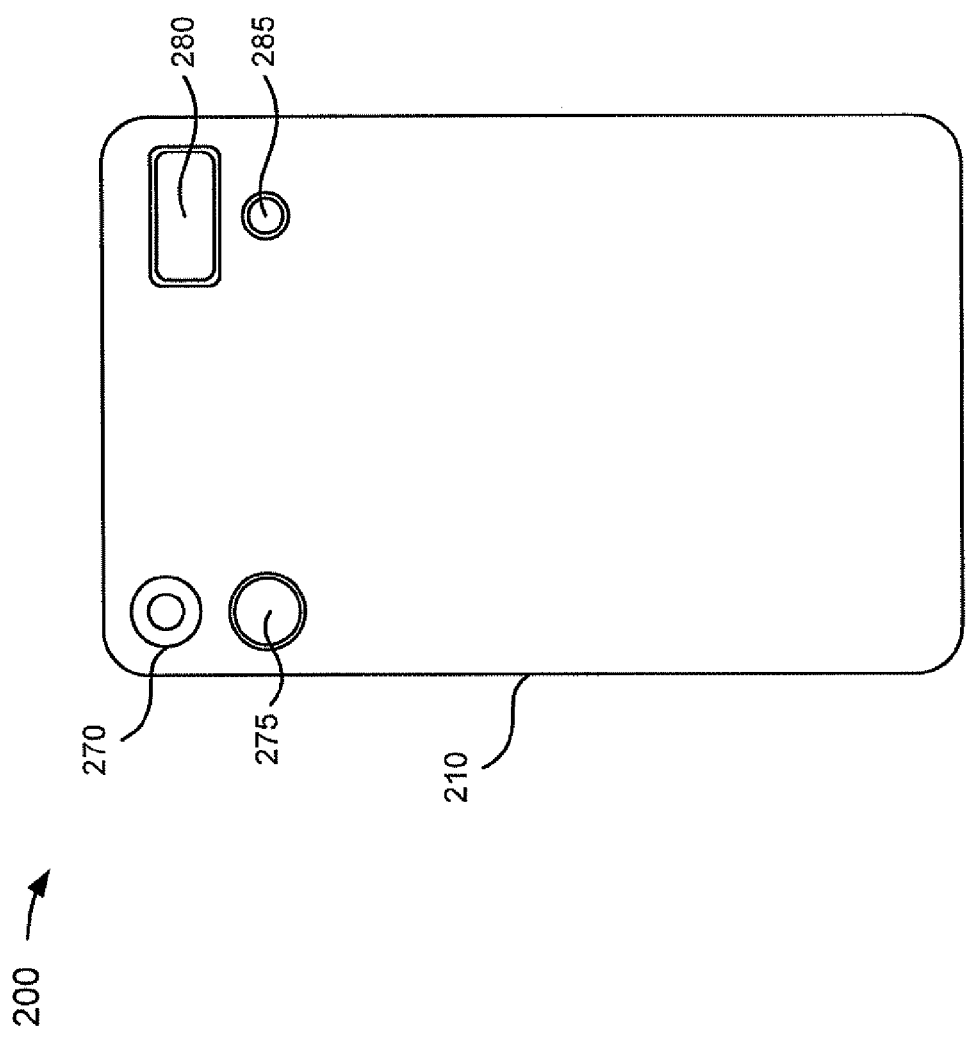

FIGS. 2A and 2B are front and rear views, respectively, of another exemplary device 200 in which systems and methods described herein may be implemented. As shown in FIG. 2A, device 200 may include a housing 210, a speaker 220, a display 230, control buttons 240, a keypad 250, and a microphone 260. Housing 210 may protect the components of device 200 from outside elements. Speaker 220 may provide audible information to a user of device 200.

Display 230 may provide visual information to the user. For example, display 230 may provide information regarding incoming or outgoing calls, media, games, phone books, the current time, etc. In another example, display 230 may provide an electronic viewfinder, e.g., a cathode ray tube (CRT), liquid crystal display (LCD), or an organic light-emitting diode (OLED) based display that a user of device 200 may look through to view and/or focus on a subject and/or to replay previously captured material.

Control buttons 240 may permit the user to interact with device 200 to cause device 200 to perform one or more operations. For example, control buttons 240 may be used to capture an image of the subject by device 200 in a similar manner as button 170 of device 100. Keypad 250 may include a standard telephone keypad. Microphone 260 may receive audible information from the user.

Figure 3:
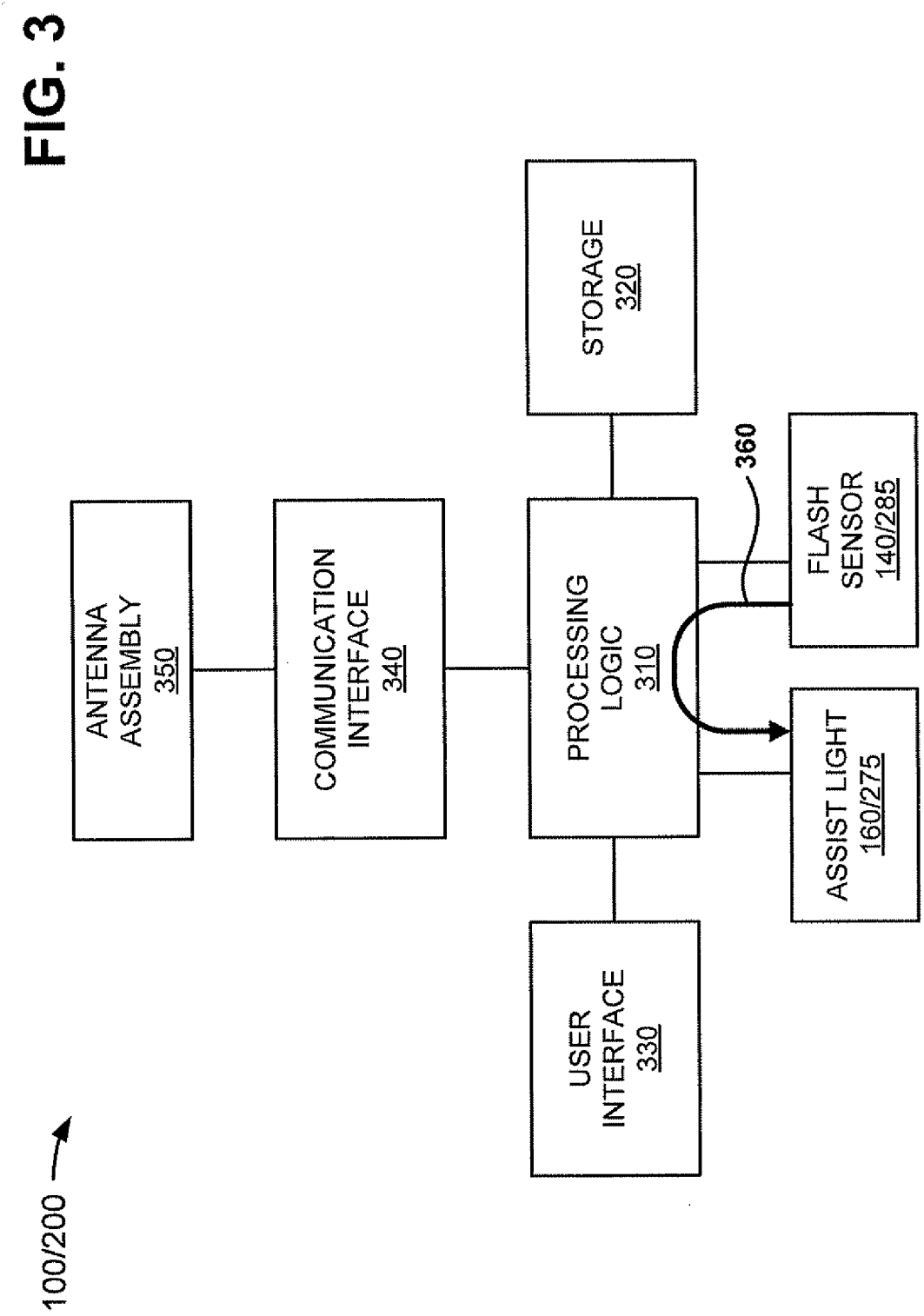
FIG. 3 is a diagram of exemplary components of the devices of FIGS. 1-2B.

As shown in FIG. 2l3, device 200 may further include a camera lens 270, an assist light 275, a flash unit 280, and a flash sensor 285. Camera lens 270 may include components similar to the components of lens 120, and may operate in a manner similar to the manner lens 120 operates. Camera lens 270 may work in conjunction with an autofocus system (not shown) that may enable lens camera lens 270 to obtain the correct focus on a subject, instead of requiring a user of device 200 to manually adjust the focus. The autofocus system may rely on one or more autofocus sensors (not shown) to determine the correct focus. The autofocus system may permit manual selection of the autofocus sensor(s), and may offer automatic selection of the autofocus sensor(s) using algorithms which attempt to discern the location of the subject The data collected from the autofocus sensors may be used to control an electromechanical system that may adjust the focus of the optical system.

Assist light 275 may include components similar to the components of assist light 160, and may operate in a manner similar to the manner assist light 160 operates. Assist light 275 may be a supplementary lighting system used to aid the autofocus system provided in camera lens 270 achieve focus and to ensure proper exposure in low light conditions. Assist light 275 may include, for example, an autofocus assist light, a video/snapshot exposure assist light, one or more light-emitting diodes (LEDs), one or more white incandescent lights, or another light source that aids in low light conditions.

Flash unit 280 may include components similar to the components of flash unit 130, and may operate in a manner similar to the manner flash unit 130 operates. For example, flash unit 280 may include a flash unit built into device 200, a flash unit separate from device 200, an electronic xenon flash lamp, a microflash, etc.

Flash sensor 285 may include components similar to the components of flash sensor 140, and may operate in a manner similar to the manner flash sensor 140 operates. For example, flash sensor 285 may include a sensor provided on the front of flash unit 280 which determines the luminance of the subject (e.g., the amount of flash light reflected back from the subject) and cuts off flash unit 280 once it determines that the subject has been properly illuminated; a TTL flash sensor; a multi-sensor TTL flash metering system; an autofocus-coupled multi-sensor TTL flash metering system; a balanced TTL flash metering system; etc.

FIG. 3 is a diagram of exemplary components of device 100 or 200. As shown in FIG. 3, device 100/200 may include processing logic 310, storage 320, a user interface 330, a communication interface 340, and an antenna assembly 350. Processing logic 310 may include a processor, microprocessor, an application specific integrated circuit (ASIC), field programmable gate array (FPGA), or the like. Processing logic 310 may control operation of device 100/200 and its components. Storage 320 may include a random access memory (RAM), a read only memory (ROM), and/or another type of memory to store data and instructions that may be used by processing logic 310.

User interface 330 may include mechanisms for inputting information to device 100/200 and/or for outputting information from device 100/200. Examples of input and output mechanisms might include a speaker (e.g., speaker 220) to receive electrical signals and output audio signals; a camera lens (e.g., lens 120 or camera lens 270) to receive image and/or video signals and output electrical signals; a microphone (e.g., microphone 260) to receive audio signals and output electrical signals; buttons (e.g., a joystick, button 170, control buttons 240, or keys of keypad 250) to permit data and control commands to be input into device 100/200; a display (e.g., display 230) to output visual information (e.g., image and/or video information received from camera lens 270); and/or a vibrator to cause device 100/200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks).

Flash sensor 140 or 285 may obtain information 360 regarding the luminance of a subject, and may provide luminance information 360 to assist light 160 or 275, via processing logic 310. In one implementation, luminance information 360 may be used to adjust the output or illuminance provided by assist light 160/275 so that assist light 160/275 provides a constant luminance reflected from the subject. The illuminance produced by assist light 160/275 may depend on the distance between device 100/200 and the subject. This dependence may be approximately quadratic (e.g., if assist light 160/275 produces an irradiance of 1 Watts/cm$^2$ at 1 meter (m), then it may produce an irradiance of 4 Watts/cm$^2$ at 0.5 m). Therefore, the output or illuminance of assist light 160/275 may be controlled by measuring the output of flash sensor 140/285 so that the reflected light level (luminance or radiance) from the subject may be constant regardless of the distance between device 100/200 and the subject. The regulation of the output of assist light 160/275 may occur almost instantaneously since the response times of assist light 160/275 and flash sensor 140/285 may be almost instantaneous. Such an arrangement may prevent saturation of the autofocus sensor as well as prevent blinding of the subject.

As will be described in detail below, device 100/200 may perform certain operations relating to control of assist light 160/275 based on luminance information 360 provided by flash sensor 140/285. Device 100/200 may perform these and other operations in response to processing logic 310 executing software instructions of an application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with principles of the invention. Thus, implementations described herein are not limited to any specific combination of hardware circuitry and software.

Exemplary Device Operation

Figure 4:
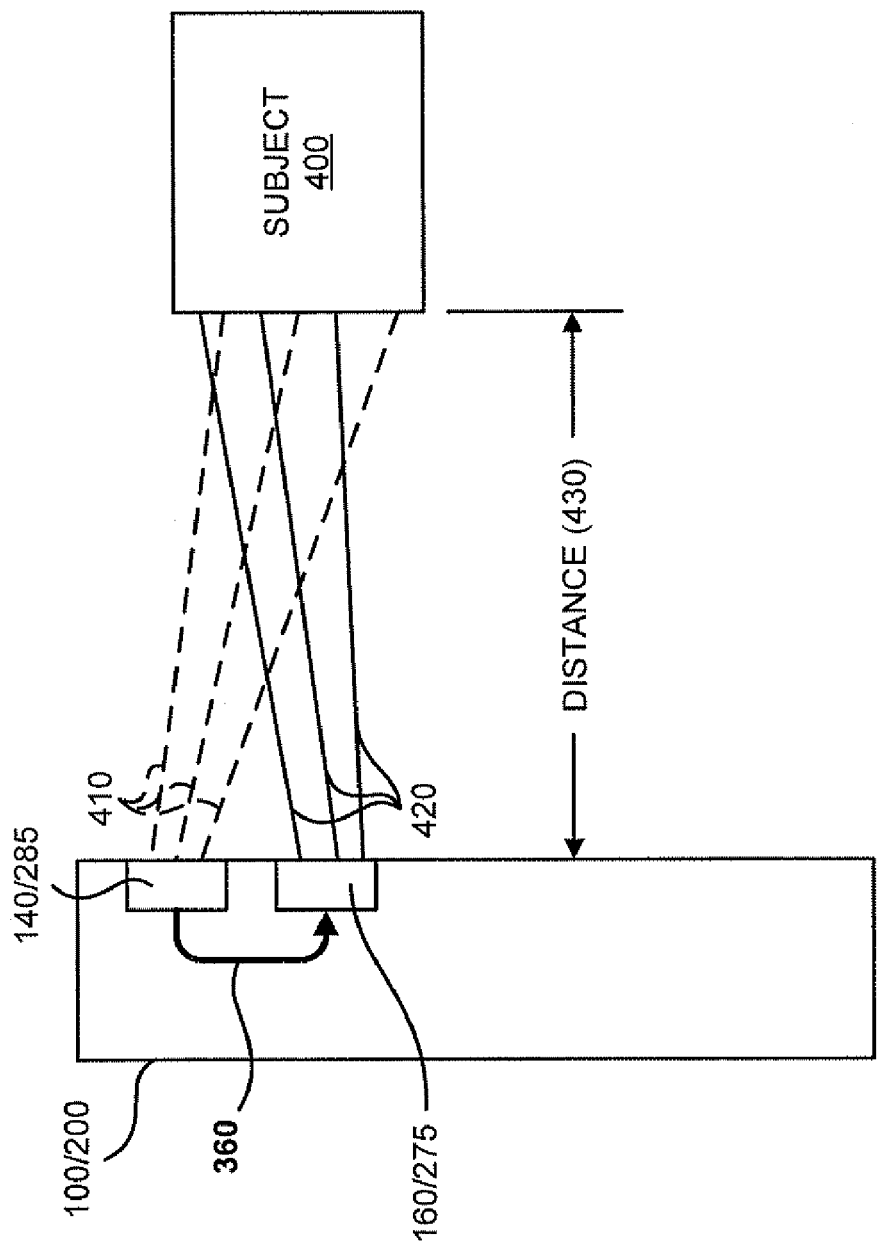
FIG. 4 is a diagram of an exemplary operation of the devices of FIGS. 1-2B.

FIG. 4 is a diagram of an exemplary operation of device 100/200. As shown, device 100/200 may be arranged with a subject 400, e.g., so that device 100/200 may capture an image of subject 400. In one implementation, flash sensor 140/285 may receive light 410 reflected from subject 400 and may calculate a luminance provided by subject 400 based on reflected light 410, via processing logic 310 (not shown). For example, the luminance of subject 400 may be determined by adding the amount of light 410 received by flash sensor 140/285. Luminance information 360 may be provided to assist light 160/275, via processing logic 310.

Assist light 160/275 may provide light 420 with an illuminance that is based on luminance information 360. For example, luminance information 360 may be used to adjust the output or illuminance of light 420 from assist light 160/275 so that subject 400 provides a constant reflected light level or luminance.

The illuminance to subject 400 that may be produced by assist light 160/275 may depend on a distance 430 between device 100/200 and subject 400. Reflected light 410 which strikes flash sensor 140/285 may change with distance 430. Therefore, the illuminance of light 420 from assist light 160/275 may be controlled by measuring the luminance of reflected light 410, as determined by the output of flash sensor 140/285, so that the reflected light level (i.e., luminance or radiance) provided by subject 400 may be constant regardless of distance 430 between device 100/200 and subject 400. For example, the output or illuminance of assist light 160/275 may be greater when the luminance of reflected light 410 is smaller, and may be smaller when the luminance of reflected light 410 is greater. This may prevent saturation of the autofocus sensor and blinding of subject 400.

In one exemplary implementation, assume assist light 160/275 provides a brightness of 20 cd (candela), which provides an illuminance (i.e., the psychophysical version of irradiation) of twenty (20) luxes at one (1) meter. If device 100/200 is arranged with a white piece of paper with a Lambertian reflectance of 1.0, the luminance (the psychophysical version of radiation) from the paper may be 20/pi, which is approximately seven (7) cd/m² (candela per meter squared). If device 100/200 is moved closer to the piece of paper, e.g., to ten (10) centimeters (cm), the illuminance may increase by a factor of one-hundred (100) to two-thousand (2000) luxes and the luminance from the paper may increase proportionately if the paper brightness is kept constant. If the luminance of the paper is to be maintained, the brightness of assist light 160/ 275 may be decreased by a factor of one-hundred (100) to 0.2 cd so that the luminance may be maintained at approximately seven (7) cd/m².

Exemplary Process

Figure 5:
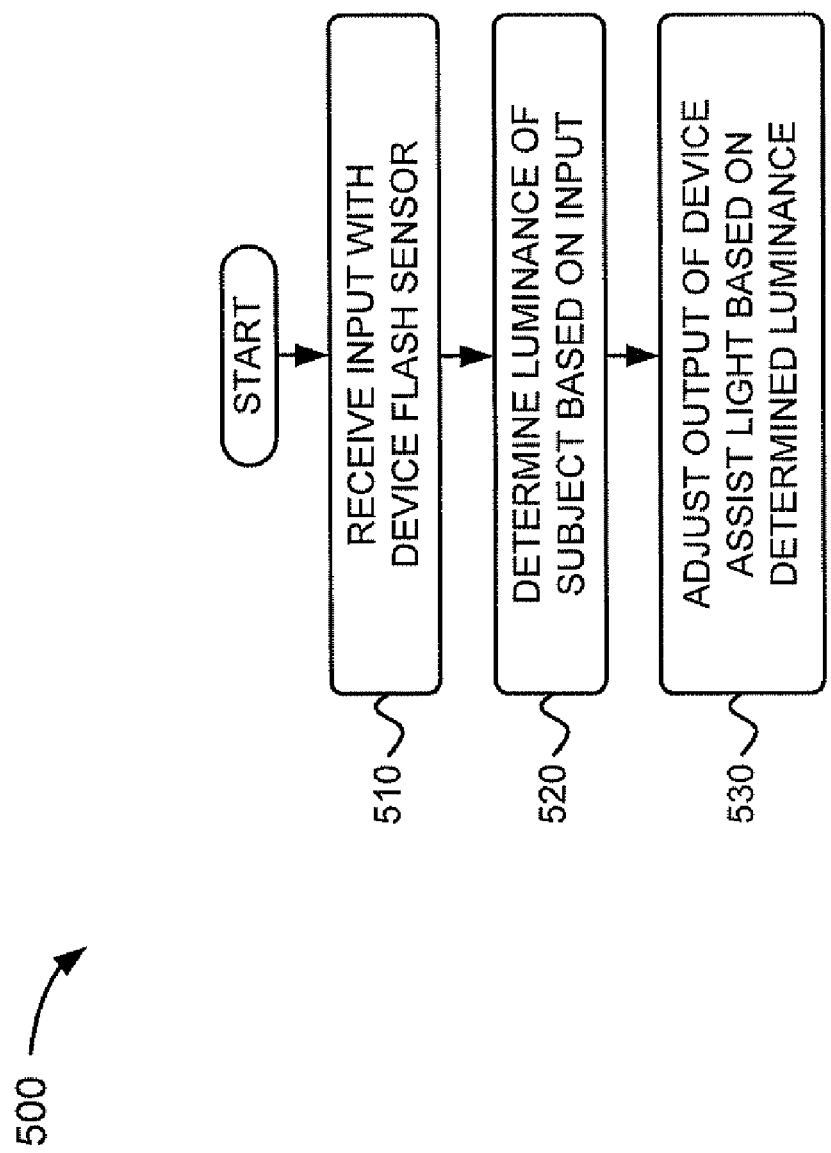
FIG. 5 is a flowchart of a process according to an exemplary implementation.

FIG. 5 is a flowchart of a process 500 according to an exemplary implementation. Process 500 may receive input with a flash sensor of a device (block 510). For example, in one implementation described above in connection with FIG. 4, flash sensor 140/285 may receive light 410 reflected from subject 400.

As further shown in FIG. 5, process 500 may determine a luminance of a subject based on the input received by the flash sensor (block 520). For example, in one implementation described above in connection with FIG. 3, flash sensor 140/285 may obtain luminance information 360, and may provide luminance information 360 to assist light 160/275, via processing logic 310. In another implementation described above in connection with FIG. 4, flash sensor 140/285 may calculate the luminance of subject 400 based on reflected light 410, via processing logic 310. For example, the luminance of subject 400 may be determined by adding the amount of light 410 reflected from subject 400 and received by flash sensor 140/285. Luminance information 360 may be provided to assist light 160/275, via processing logic 310.

Process 500 may adjust an output of an assist light of the device based on the determined luminance (block 530). For example, in one implementation described above in connection with FIG. 3, luminance information 360 may be used to adjust the output or illuminance of assist light 160/275 so that assist light 160/275 provides a constant luminance reflected from the subject or a constant luminance reflected from the subject. In another implementation described above in connection with FIG. 4, assist light 160/275 may provide light 420 with an illuminance that is based on luminance information 360. For example, luminance information 360 may be used to adjust the output or illuminance of light 420 from assist light 160/275 so that subject 400 provides a constant reflected light level.

CONCLUSION

Implementations described herein may relate to systems and methods for controlling the illuminance of an assist light of a device. In one implementation, the device may include a flash sensor that may determine a luminance or radiance of a subject. The flash sensor may control the light output or illuminance of a flash unit of the device based on the determined luminance of the subject. The flash sensor may also be used to control the output or illuminance of the assist light of the device based on the determined luminance of the subject. For example, the luminance determined by the flash sensor may be used to control the output of the assist light so that the luminance of the subject may be constant, regardless of the distance between the device and the subject. Control of the assist light illuminance may occur almost instantaneously since the response times of the flash sensor and assist light may be almost instantaneous. Such an arrangement may prevent saturation of an autofocus sensor of the device, overexposure, and blinding of the subject.

The foregoing description of preferred embodiments provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 5, the order of the acts may be modified in other implementations consistent with principles of the invention. Further, non-dependent acts may be performed in parallel.

Although the detailed description described using a flash sensor (e.g., flash sensor 140 or 285) to measure the luminance of a subject, in other implementations, device 100/200 may utilize other sensors capable of measuring the luminance of the subject (e.g., a luminance sensor provided in the body of device 100/200).

It should be emphasized that the term "comprises/comprising" when used in the this specification is taken to specify the presence of stated features, integers, steps or components but does not preclude the presence or addition of one or more other features, integers, steps, components or groups thereof.

Embodiments, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a device, the method comprising:
    providing, via an assist light of the device, an optical output to a subject;
    receiving, via a flash sensor of the device, an optical input;
    determining, via the flash sensor, a luminance of the subject based on the optical input, where the luminance of the subject includes an amount of light reflected from the subject and detected by the device; and
    adjusting the optical output of the assist light, in substantially real time, based on the luminance of the subject,
    where adjusting the optical output of the assist light includes:
        increasing the optical output of the assist light as the luminance of the subject decreases, and
        decreasing the optical output of the assist light as the luminance of the subject increases, and
    where the increasing and decreasing of the optical output of the assist light causes the luminance of the subject to remain substantially constant as a distance between the subject and the device changes.

2. The method of claim 1, where the optical input includes light reflected from the subject.

3. The method of claim 2, where the luminance is determined by summing amounts of light reflected from the subject and detected at the device.

4. The method of claim 1, where the assist light comprises an autofocus assist light.

5. The method of claim 1, where the assist light comprises an exposure assist light.

6. The method of claim 1, where adjusting the optical output of the assist light includes varying the optical output in a quadratic dependence of the distance between the subject and the device.

7. A device comprising:
    a flash sensor to receive an optical input;
    an assist light to output light to a subject; and
    processing logic to:
        determine a luminance of the subject based on the optical input, where the luminance of the subject includes an amount of light reflected from the subject and detected by the device, and
        adjust, in substantially real-time, the output of the assist light based on the luminance of the subject,
    where the processing logic, when adjusting the output of the assist light, is further to:
        increase the optical output of the assist light as the luminance of the subject decreases, and
        decrease the optical output of the assist light as the luminance of the subject increases, and
    where the processing logic, when increasing and decreasing of the output of the assist light, is further to causes the luminance of the subject to remain substantially constant as a distance between the subject and the device changes.

8. The device of claim 7, where the processing logic, when adjusting the output of the assist light, is to vary the output in a quadratic dependence of the distance between the subject and the device.

9. The device of claim 7, where the assist light includes at least one of:
    one or more light-emitting diodes (LEDs); or
    one or more white incandescent lights.

10. The device of claim 7, where the device includes at least one of:
    a radiotelephone;
    a personal communications system (PCS) terminal;
    a laptop;
    a personal computer;
    an MP3 player;
    a camera;
    a video camera with camera capabilities;
    binoculars; or
    a telescope.

11. The device of claim 7, where the flash sensor comprises a light sensor that receives light reflected back from the subject.

12. The device of claim 7, where the optical input includes light reflected from the subject.

13. The device of claim 12, where the luminance is determined by summing amounts of light reflected from the subject and received at the device.

14. The device of claim 7, where the assist light comprises an autofocus assist light.

15. The device of claim 7, where the assist light comprises an exposure assist light.

16. The device of claim 7, where the output of the assist light increases as the luminance of the subject decreases, and the output of the assist light decreases as the luminance of the subject increases.

* * * * *